(12) United States Patent
Rivier

(10) Patent No.: US 7,208,185 B2
(45) Date of Patent: *Apr. 24, 2007

(54) CONFECTIONERY PRODUCT HAVING AN ENHANCED COOLING EFFECT AND METHOD OF MAKING

(75) Inventor: Vincent Rivier, Piegano (IT)

(73) Assignee: Nestec S.A., Vevey (CH)

( * ) Notice: Subject to any disclaimer, the term of this patent is extended or adjusted under 35 U.S.C. 154(b) by 289 days.

This patent is subject to a terminal disclaimer.

(21) Appl. No.: 10/279,933

(22) Filed: Oct. 25, 2002

(65) Prior Publication Data

US 2003/0068422 A1 Apr. 10, 2003

Related U.S. Application Data

(63) Continuation of application No. PCT/EP01/03677, filed on Apr. 2, 2001.

(30) Foreign Application Priority Data

May 3, 2000 (EP) .................................. 00201596

(51) Int. Cl.
*A23G 3/54* (2006.01)
*A23G 4/18* (2006.01)
*A23G 4/20* (2006.01)

(52) U.S. Cl. ............................. 426/3; 426/5; 426/660

(58) Field of Classification Search .................... 426/5, 426/295, 96, 138, 514, 516, 143, 282, 512, 426/518, 103, 77, 78, 3, 660, 89; 99/494
See application file for complete search history.

(56) References Cited

U.S. PATENT DOCUMENTS

| | | | |
|---|---|---|---|
| 3,620,759 A * | 11/1971 | Maddox | 426/78 |
| 4,105,801 A | 8/1978 | Dogliotti | 426/99 |
| 4,293,570 A * | 10/1981 | Vadasz | 426/3 |
| 4,513,012 A | 4/1985 | Carroll et al. | 426/5 |
| 4,762,719 A * | 8/1988 | Forester | 424/440 |
| 4,938,128 A * | 7/1990 | Knebl | 99/450.6 |
| 5,273,771 A | 12/1993 | Rapaille et al. | 426/548 |
| 5,601,886 A | 2/1997 | Ishikawa et al. | 426/660 |
| 5,824,358 A | 10/1998 | Bye et al. | 426/658 |

FOREIGN PATENT DOCUMENTS

| | | |
|---|---|---|
| DE | 19641381 | 4/1998 |
| EP | 0 372 596 A2 | 6/1990 |
| WO | WO 97/03569 | 6/1997 |

OTHER PUBLICATIONS

The American Heritage® Dictionary of the English Language: Fourth Edition. 2000. Retrieved from the internet Mar. 31, 2005. URL <http://www.bartleby.com/61/31/C0783100.html>.*

* cited by examiner

*Primary Examiner*—Arthur L. Corbin
(74) *Attorney, Agent, or Firm*—Bell, Boyd & Lloyd LLP

(57) ABSTRACT

The invention relates to a novel confectionery product comprising a casing of a protective confectionery material and a filling enclosed within the casing, wherein the casing is configured to enable the filling to be released without the casing having to be substantially dissolved and; wherein the filling includes a major amount of monosaccharide polyol in a crystalline anhydrous powder form chosen among polyols having a cooling effect. Preferably, the filling represents 6 to 40% by weight of the product and includes xylitol, erythritol, sorbitol or a combination thereof.

22 Claims, 2 Drawing Sheets

CONFECTIONERY PRODUCT HAVING AN ENHANCED COOLING EFFECT AND METHOD OF MAKING

CROSS-REFERENCE TO RELATED APPLICATIONS

This application is a continuation of the U.S. national stage designation of International application PCT/EP01/03677 filed Apr. 2, 2001, the content of which is expressly incorporated herein by reference thereto.

TECHNICAL FIELD

The present invention relates to a novel confectionery product capable which produces an enhanced refreshing effect in the mouth. The present invention also relates to a method for providing a refreshing cooling effect in the mouth during consumption of the confectionery product.

BACKGROUND OF THE INVENTION

In the confectionery field, it is known to use sugar substitutes in the composition of high boiled candies, low boiled candies or chewable gums in amounts sufficient to provide a sweetening effect for replacing totally or partially the sugar while conferring similar setting and hardening properties. Sugar substitutes are chemically known as polyhydric alcohols or polyols. These polyols are good sweeteners and they advantageously help reduce the amount of calories in the confectionery product. They also have a well recognized beneficial effect on the reduction of tooth decay. Indeed, such polyols are resistant to the metabolism by oral bacteria which break down the sugars and starches to produce acids responsible for decay. For example, WO 97/03569 describes a specific sugar-free candy with a hygroscopic hard cooked maltitol core encased within a hard cooked non-hygroscopic sugar alcohol casing.

For these reasons, such polyols have been widely used as ingredients of confectionery products. A few polyols, such as xylitol or erythritol, are also known as having refreshing or cooling properties, which are mainly due to their negative heat of solution of a magnitude much higher than any other polyols or sugars. Therefore, these particular polyols have served as sugar substitutes mainly in the composition of chewing gums or toothpaste.

U.S. Pat. No. 4,105,801 relates to a dragé comprising a core and a shell of edible material enveloping the core and adhering to the latter, wherein the shell is formed by an intimate mixture of microcrystals of xylitol with a fatty substance. The core can be selected from a great variety of edible materials such as gums, jelly, almonds or agglomerated sugar or polyol mass. The goal of this patent is to make a xylitol shell of extremely compact and intimate microcrystalline structure having a smooth aspect of the outer surface thereof. Although the resulting product might have a certain pleasant sensation of freshness in the mouth due to the presence of xylitol in the coating of the confectionery, the effect only remains a relatively cool solid taste of the coating which melts slowly into the mouth. The cooling effect is also likely to be hidden, or at least reduced, because of the presence of the fat such as the cocoa butter that is added to the mixture to form the compact microcrystalline xylitol layer. Furthermore, the xylitol remains thermodynamically unstable and hygroscopic, so that its use only in the coating is unsuitable in that it might lose its refreshing power over time. Also, when in the presence of a warm and wet environment, the coating would have a tendency to dissolve while calorific energy is given off by the resulting solution before the sweet is consumed.

In view of this, improved confectionery products for providing an enhanced cooling effect are needed, and the present invention provides such improved products.

SUMMARY OF THE INVENTION

The present invention provides a novel confectionery in which the cooling effect is enhanced by conferring a refreshing mouthfeel in the form of a feeling of "liquid" release while also preserving a cooling efficiency which remains unchanged over an extensive period of time. To do this, the invention provides a confectionery product comprising a casing of a protective confectionery material and a filling included within the casing. Preferably, the filling is enclosed within the casing and comprises a major amount of monosaccharide polyol in crystalline anhydrous powder form chosen from among polyols having a cooling effect.

It has been surprisingly found that when the crystalline powder filling is released from the protective casing, either during chewing or after the casing has melted sufficiently, one obtains a unique "liquid" and fresh mouthfeel. This feeling of having a "liquid" differentiates from the solid taste of polyols in compact or agglomerated form as used in either the coatings or the solid cores of the prior art. The effect is also preserved by the fact the polyol is kept on a thermodynamic point of view, in a very stable and efficient state over time, as it is protected from environment by the casing and especially from moisture ingress. This confectionery product confers a sudden rapid and perceivable release in the mouth of a cooling effect without the consumer necessarily having to chew or bite the confectionery product.

BRIEF DESCRIPTION OF THE DRAWING FIGURES

The invention will now be described in greater detail in the following description, wherein.

DETAILED DESCRIPTION OF THE PREFERRED EMBODIMENTS

Figure 1:
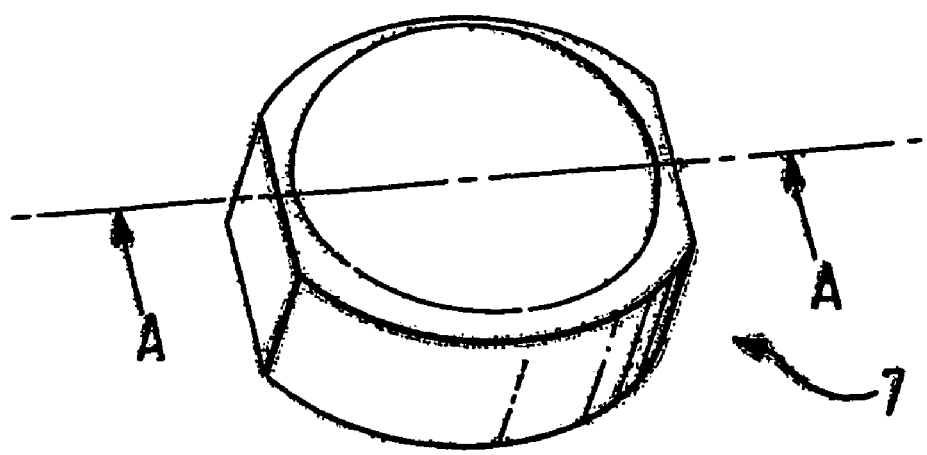
FIG. 1 shows a perspective view of a filled sweet of the invention.

The polyols which are used to make the powder filling of the invention are those which have high negative heat of solution. The heat of solution is a thermodynamic expression to define the amount of heat a solution requires to dissolve one gram of solute. In the case of polyols having a cooling effect, the energy is given off by the solution so as to make the heat of solution negative. The polyols of the invention have generally a heat of solution of less than $-25$ cal/g, preferably less than $-30$ cal/g. As a matter of comparison, sucrose is known as having a heat of solution of $-4$ cal/g only. When the filling is contacted by saliva in the mouth, the thermodynamic reaction of the anhydride polyol with the saliva occurs instantaneously and solubility also takes place thus conferring the impression that the powdered filling is a fresh "liquid". It is also preferred that the solubility of the polyols for the filling is relatively high. More particularly, the solubility should preferably be higher than 240 g/100 g of water at 37° C. The higher the solubility, the more liquid the filling should feel. However, if too hygroscopic, the filling might lose its reactivity over time.

The filling is preferably a powder that is found in a free flowing state within the casing; i.e., that is not highly compressed or agglomerated in a solid self-cohesive shape before encapsulation within the casing. The fresh "liquid" effect is indeed also dependent on the flowing properties of the powder when leaving the casing. The quicker the powder can discharge in the mouth, the greater the exploding fresh liquid effect is perceived as the powder is immediately available to melt in contact with the saliva. In the undesirable situation in which the polyol is agglomerated to make a cohesive mass, the release of the polyol is delayed thus conferring a more "solid" taste similar to the taste of crystallized polyol coatings.

The monosaccharide polyol is preferably xylitol, erythritol, sorbitol or combinations thereof. Based on testing, Xylitol is preferred as it is one of the polyols that tasted the more "liquid" and fresh, at the same time, upon release in mouth. It also has a medium-range solubility which makes it both very reactive but also capable to sustain an extensive period of storage within the casing of the invention. Xylitol has a heat of solution of between –30 to –45 g/cal depending upon the chemical purity of the product (for instance, the commercial product Xylisorb® supplied by Roquette Frères of Lille, France is –34.8 g/cal). Solubility of xylitol is about 250–260 g/100 g of water at 37° C. whereas sucrose has a solubility under 230 g/100 g and maltitol has a solubility of less than 205 g/100 g. Sorbitol has a higher hygroscopicity and a water solubility of about 330–340 g/100 g (at 37° C.) but a lower heat of solution in the range of –28 to –26 g/cal. Sorbitol is supposed to have a slightly higher cooling effect than xylitol which can be measured by the instant fall of temperature when a determined amount of powder is added to water. The measured cooling effect of sorbitol is about –22° C. whereas xylitol is about –20° C. (instant fall of temperature when 150 g of powder are added to 50 ml of water at 37° C.). However, in practice, xylitol provides a sharper combined "liquid" and fresh sensation in mouth than sorbitol. Anhydride crystals of Erythritol differ from other polyols in that they are less water soluble but have a very negative heat of solution of about –42 to –45 g/cal which confer a relatively weaker liquid feeling but a very cool sensation in mouth. However, the use of Erythritol is limited to Japan only, due to legal reasons, whereas it is still not admitted in the other countries in the application to food products.

The control of the granulometry of the powder has also proved to be important to enhance the cooling effect as well as to speed up the melting reaction in mouth. The finer the particles of powder, the more the polyol mass when released tastes "liquid" with no gritty sensation in mouth. Finer free flowing particles promote the surface of contact of the polyol substrate with liquid during release which has as the consequence to concentrate the heat exchanges in a much shorter period of time. More specifically, substantially at least 85% by weight, preferably at least 95%, of the particles have a size preferably less than 250 microns. More preferably, at least 30% by weight, preferably 40%, of the particles have even less than 100 microns. A suitable example of particle size distribution is: less than 0.1% wt of more than 500 microns, less than 1.2% of between 500 to 250 microns, 48% of between 250 to 100 microns and the remainder of less than 100 microns.

The filling consists essentially of anhydride polyol as aforementioned. However, a small amount of other ingredients might be added to flavor and/or sweeten the filling or also to make it fizzy, for instance. In particular, natural or artificial flavoring agents may be used. Spray-dried and freeze-dried fruit juice such as lemon, orange, strawberry or others, may advantageously be added in an amount lower than 20% by weight, preferably lower than 12% by weight of the filling. Acids may also be added such as citric acid or maleic acid in amount preferably in the range of 0.1 to 3% by weight. A small amount of bicarbonate may also be added to have a slight effervescent effect. Functional ingredients such as antioxidants may also be added. As the antioxidant, those authorized as food additives, for example, vitamin C, vitamin E or extracts of plants, can be used. Edible colorants might also be added when necessary.

The amount of the filling must be effective to produce the liquid and cooling effect that is sought. Therefore, the content of non-polyol in the filling should not exceed 40% by weight of the filling. Therefore, the amount of polyol with the intended cooling effect should be of at least 60%, preferably at least 85% by weight of the filling.

In a preferred aspect, the filling part should represent between 6 to 30% by weight of the whole confectionery product including the casing part, more preferably, 8 to 22% by weight, and even more preferably 11 to 18% by weight. The maximum amount of filling has proved to be a limiting factor for two main technical reasons. The first reason is due to the process difficulties that have been experienced for encasing the filling with a too high proportion of powder when using the conventional die forming method. If the casing is not sufficiently closed, the powder may leak out from the casing thus causing a poor reactive effect upon consumption due to the lack of powder left in the casing. The second reason for a limited proportion of the filling is that the casing is also weakened with a too small thickness of the walls that might cause the fracture of the casing, in particular upon packaging of the product, if no very special attention is paid, that would lead to an increase of the rate of defective packaged products.

The filling may entirely or only partially fill the casing depending upon the size of the casing. For relatively small or medium size candies, the casing is entirely filled with the filling so as to ensure the desired liquid effect. The casing has dimensions of usual candies; i.e., a main weight ranging from 1 to 6 g, and preferably from 1.2 to 3 g. It is not desirable to have candies of a weight beyond the given range as polyols have also laxative side effects that could be a problem for sensitive persons if used in too large proportions.

In a preferred aspect of the invention, the casing of the confectionery is a boiled sweet, also commonly called hard sweet or high boiled candy which is a solid, glassy and amorphous casing. The casing may contain only sugar alcohols. In that case, the confectionery is thus entirely sugar-free, non cariogenic and low calorie which also makes it suitable for children, elderly people or diabetics. The sugar alcohols for the casing can be of any commercially available, economically satisfactory, sugar alcohols which are suitable for the production of non-hygroscopic hard candy. The polyalcohols for the casing are preferably selected from the group consisting of isomalt, sorbitol, maltitol, lactitol, mannitol, polydextrose and combination thereof. The final moisture content of the casing is preferably less than 3% by weight, preferably of about 2% by weight so as to confer an extended shelf life of the product and efficiently keep the filling dry and reagent.

Besides the polyalcohols, carbohydrates such as sucrose and hydrogenated glucose syrup or other sugars can also be used in mixture with or in replacement to polyalcohols to make the casing. For instance, the casing may have a carbohydrate composition which is less sticky and has a lower tendency to loose its glassy appearance as described in U.S. Pat. No. 5,601,866 for which reference is made herein. Relevant additives such as natural or artificial flavorants, colorants or other active ingredients such as acids or sweeteners can be added in conventional amounts to the composition of the casing.

As already mentioned, the casing should have a sufficient thickness to withstand manipulation and packaging operations without easily breaking or fracturing which would cause loss of powder and consequently would impart no or reduced cooling effect. Preferably, the thickness of the casing is between 1 to 4 mm, and more preferably between 1.5 to 2.5 mm. The casing may be formed of one or several layers of different hardness, texture and/or flavors. For instance, it may comprise a hard thin coating covering a softer inner layer.

Figure 2:
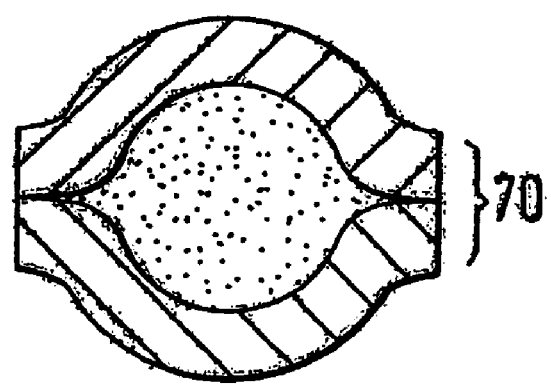
FIG. 2 shows a cross sectional view of the sweet of FIG. 1 along line A—A.
Figure 3:
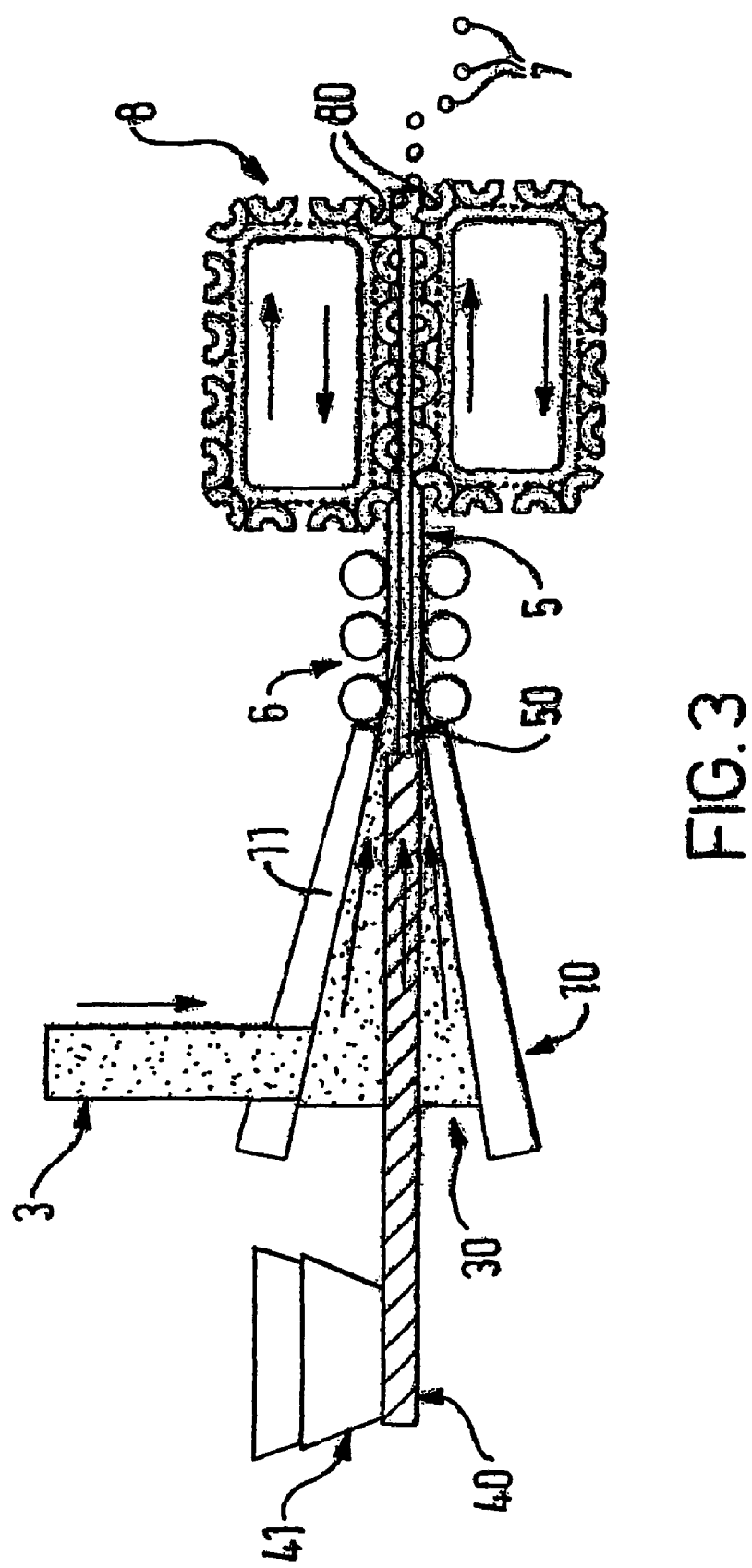
FIG. 3 illustrates a preferred process for producing the filled sweet of FIGS. 1 and 2.

High boiled casings of the invention can be obtained by extensive dehydration of a slurry. Generally, the slurry is made of an aqueous mixture of saccharides and/or polyhydric alcohols which is boiled in suitable proportions in a cooker at a temperature of 130–150° C., preferably under vacuum conditions, to reach a high final solids content of less than 2.5%, preferably of about 1%. After cooking, the cooked mass is poured onto a cold slab to reach a suitable plastic consistency. As shown in FIG. 3, the cooked plastic mass 3 is conveyed to a batch roller 10 in which a cone 30 of the plastic mass is pulled out. The batch roller includes a number of conical rollers 11 depending on the manufacturer's specifications which have the function of forming a continuous rope of plastic mass at the end. A centre filling pipe 40 is positioned in the cone of confectionery and the centre filling 50 is forced by along the pipe which extends into about two thirds to 90% of the cone's length. For example, a Batch Former model 7RL with file pipe is commercialised by Nuova Euromec that leaves the batch roller contains the filling 50 of polyol crystal powder. The powder for the filling comes from an auger 41 to feed the centre pipe 40. The next stage consists in sizing the rope 5 to the desired cross-section by using a rope sizer 6 such as a Ropesizer model 61FL from Nuova Euromec, Machinery Divison, 24057 Martinengo (Bg), Italy. Individual confectionery products 7 are cut and shaped from the sized filled rope in a die forming device 8 such as a chain die like assembly having a high output rate (such as model 52STV from Nuova Euromec). The chain die assembly 8 comprises pairs of half-die members 80 that assemble during the rotation of the chains and punch the filled rope into the individual desired closed shapes. The cut ends of the filled sweet are thus closed or partially closed by punching. The closing generally forms, on both sides of the sweet, areas of reduced thickness 70 of the casing as illustrated in FIG. 2. In some cases where the amount of filling is high, the closure of the casing is entirely secured. As aforementioned, the proportion of filling should not exceed 30% by weight, preferably 22%, even preferably 18% by weight, to limit serious closure problems that would lead to accidental leakage of the filling. However, there may be a benefit to have at least one zone of reduced thickness and/or even one small hole within the casing to enable the filling to discharge progressively in mouth. Such zone(s) of reduction and/or hole (s) should be capable to form at least one passage communicating with the filling of a size effective to allow at least part of the filling to be progressively freed into the mouth. When small holes are formed within the casing, they should be of a size that does not allow significant leakage of the powder in the conditions of storage. Small holes are intended to be holes equal to or less than 250 microns, and preferably equal to or less than 100 microns, within the casing. Zones of reduced thickness form weaker zones that solubilize by saliva after only a few seconds in mouth and before the entire casing has entirely solubilized. Therefore, in both cases larger passages are left after a few seconds in mouth which finally allow at least part of the filling to be progressively freed before the rest of the casing has significantly melted. As a result of this progressive release of polyol, a very pleasant sensation of cool "liquid" is given from the casing.

In a possible alternative, the casing may be formed of a chewy crystallized structure known in the confectionery art as "low boiled" candy such as a fudge, a caramel or toffee. The method for producing the sweets is similar to the method for high boiled candy. A paste is to produce a crystallized or non-crystallized high-solids fluid that can be sized into a rope, filled and shaped by means of a die or chain die assembly.

In another variant, the casing may be made of a chewing gum. Basically, the chewable gum includes a plasticized rubber or polymer, gum base texturizers and sugar and/or bulk sweeteners such as sorbitol, mannitol, hydrogenated starch hydrolysates, isomalt and xylitol or any suitable polyalcohols. Flavors can be added to give a taste to the chewable casing which can be compounded to essential oils as it is known in the chewing gum industry. Fruit acids may also be added to the casing composition such as orange, lemon, mint, strawberry or grape to enhance the flavour effect of the casing. High intensity sweeteners can be used to increase the sweet taste such as acesulfate K, aspartame, thaumatin, glycyrrhin or saccharin. The chewing gum casing may be pan coated with sugar or sugar alcohols to confer a superficial rigid coating.

The rubber or polymer of the chewing gum may contain synthetic elastomers and/or natural elastomers. Synthetic elastomers may include, but are not limited to, polyisobutylene, isobutylene-isoprene copolymer, polyethylene vinyl acetate, polyisoprene, polyethylene, vinyl acetate-vinyl laurate copolymer and combinations thereof. Natural elastomers may include natural rubber such as latex and guayule, natural gums such as jelutong, lechi caspi, perillo, sorva, balata, etc. The preferred synthetic elastomer and natural elastomer proportions vary depending on whether the chewing gum is a conventional gum or a bubble gum. Plasticizers may include estergums, for example, or other suitable plasticizers well known in the chewing gum industry.

Texturizers may include magnesium and calcium carbonate, ground limestone, silicate, clay, alumina, talc, titanium oxide, phosphates, cellulose polymers, and combinations thereof.

EXAMPLE

A non-limiting example is described below with percentages given by weight, unless otherwise indicated.

A casing whose recipe is composed by 80% isomalt, 10% maltitol syrup and 10% water is cooked to high final solids until 145° C. The mass is then put in batch under a slight vacuum (0.9 atm.) for 3 minutes.

The cooked mass is then discharged on a cooled table and 1% citric acid, 0.15% lemon flavour, 0.8% Acesulfame K are added. The ingredients are mixed until a plastic mass is formed. This mass at 75° C. is then introduced in the batch roller.

A filling of 95% anhydrous xylitol powder, 1% citric acid, 0.2% liquid lemon and 0.35% spray dried lemon juice is pumped into the center of the cooked and aromatised isomalt mass within the batch roller and a rope calibrated in the rope sizer at an external diameter of about 15 mm is pulled into the chain die assembly. The filling pump is calibrated to pump a 15% of filling part with respect to the casing part. Xylitol filled candies are pressed in elongated oval shapes of 2 grams having dimensions of 10 by 15 mm which are cooled into a cooling tunnel until reaching a 30° C. temperature. The candies are then removed from the dies and packed in bulk into cardboard sleeves. In an alternative, each individual candy is twist wrapped or flow wrapped and then packaged in sachets.

What is claimed is:

1. A confectionery product comprising a casing composed of a protective confectionery material and a filling included within the casing, with the filling comprising a major amount of a monosaccharide polyol in a crystalline anhydrous powder form chosen from among polyols having a cooling effect, wherein the casing composed is configured with at least one portion which enables the filling to be released without having to wait for a substantial portion of the casing composed to dissolve in said consumer's mouth or without having to bite into the casing.

2. The confectionery product according to claim 1, wherein the monosaccharide polyol is xylitol, erythritol, sorbitol or a combination thereof.

3. The confectionery product according to claim 1, wherein the polyol is present in a proportion of at least 60% by weight of the filling.

4. The confectionery product according to claim 1, wherein the filling represents 6 to 40% by weight of the product.

5. The confectionery product according to claim 4, wherein the filling represents 8 to 22% by weight of the product.

6. The confectionery product according to claim 1, wherein the thickness of the casing is between 1 to 4 mm.

7. The confectionery product according to claim 1, wherein the thickness of the casing is between 1.5 to 2.5 mm.

8. The confectionery product according to claim 1, wherein at least 85% by weight of the polyol powder comprises particles having a size of less than 250 microns.

9. The confectionery product according to claim 1, wherein the casing forms a passage for communicating with the filling, with the passage being of a size effective to allow at least part of the filling to be progressively freed before the casing has significantly melted in mouth.

10. The confectionery product according to claim 1, wherein the casing comprises (a) at least one zone of reduced thickness which melts in the mouth before the casing to progressively frees the filling or (b) a hole of a size that allows the filling to exit the casing when the confectionery is placed in the mouth.

11. The confectionery product according to claim 10, wherein the casing comprises at least two zones of reduced thickness or two or more holes having an opening of equal to or less than 250 microns.

12. The confectionery product according to claim 1, wherein the filling is encased in the casing by sizing a filled rope within the casing and forming individual products by stamping the rope-filled casing in a die.

13. The confectionery product according to claim 1, wherein the casing has a hard, glassy texture comprising saccharide or sugar alcohols.

14. The confectionery product according to claim 13, wherein the casing consists essentially of at least one sugar alcohol selected from the group consisting of isomalt, sorbitol, maltitol, mannitol, lactitol, polydextrose and combination thereof.

15. The confectionery product according to claim 1, wherein the casing comprises a chewy crystallized structure or a chewing gum.

16. The confectionery product according to claim 1, wherein the filling comprises one or more of flavorants, sweeteners or acidifying agents.

17. The confectionery product according to claim 1, wherein the casing comprises at least two zones of reduced thickness.

18. The confectionery product according to claim 1, wherein the casing comprises at least two holes having an opening equal to or less than 250 microns.

19. A method for producing a confectionery having an enhanced cooling effect which comprises producing a filled confectionery rope comprising a filling consisting essentially of a monosaccharide polyol in a crystalline anhydrous powder form chosen from among polyols having cooling effect, sizing the filled rope within a casing composed of a protective confectionery material, wherein the casing is configured to have at least one zone of reduced thickness and/or one small hole therein capable of forming at least one passage communicating with the filling to enable the filling to be released without having to wait for a substantial portion of the casing to dissolve in said consumer's mouth or without having to bite into the casing, and forming individual products by stamping the rope-filled casing in a die.

20. The method of claim 19 wherein individual filled casings are formed by stamping the filled rope in a die having the counterform of the casing to be shaped.

21. A method for providing a refreshing cooling effect in a consumer's mouth during consumption of a confectionery product, which comprises providing the confectionery product in the form of a casing composed of a protective confectionery material and a filling included within the casing, with the filling comprising a major amount of a monosaccharide polyol in a crystalline anhydrous powder form chosen from among polyols having a cooling effect, with the casing configured to have at least one zone of reduced thickness and/or one small hole therein capable of forming at least one passage communicating with the filling to enable the filling to be released without having to wait for a substantial portion of the casing to dissolve in said consumer's mouth or without having to bite into the casing, and consuming the confectionery to release the cooling effect polyol into said consumer's mouth to provide the cooling effect.

22. The method of claim 21, wherein the cooling effect is preserved and remains substantially unchanged while the product is being consumed.

* * * * *